(12) United States Patent
Lesage

(10) Patent No.: US 11,285,451 B2
(45) Date of Patent: Mar. 29, 2022

(54) INJECTION DEVICE, IN PARTICULAR FOR INJECTING A HYDROCARBON FEEDSTOCK INTO A REFINING UNIT

(71) Applicant: Total Raffinage Chimie, Courbevoie (FR)

(72) Inventor: Romain Lesage, Montivilliers (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 147 days.

(21) Appl. No.: 15/306,877

(22) PCT Filed: Apr. 27, 2015

(86) PCT No.: PCT/FR2015/051132
§ 371 (c)(1),
(2) Date: Oct. 26, 2016

(87) PCT Pub. No.: WO2015/170034
PCT Pub. Date: Nov. 12, 2015

(65) Prior Publication Data
US 2017/0043311 A1    Feb. 16, 2017

(30) Foreign Application Priority Data

May 5, 2014 (FR) ...................... 1454036

(51) Int. Cl.
*B01J 8/24* (2006.01)
*B01J 4/00* (2006.01)
*C10G 11/00* (2006.01)

(52) U.S. Cl.
CPC ................ *B01J 8/24* (2013.01); *B01J 4/001* (2013.01); *C10G 11/00* (2013.01); *B01J 2208/00902* (2013.01)

(58) Field of Classification Search
CPC ..... B01J 4/00; B01J 4/001; B01J 4/002; B01J 8/24; B01J 2208/00902; B05B 1/00;
(Continued)

(56) References Cited

U.S. PATENT DOCUMENTS

| 4,434,049 | A | | 2/1984 | Dean et al. | |
|---|---|---|---|---|---|
| 5,733,510 | A | * | 3/1998 | Chinh | ................... B01J 8/1809 422/143 |

(Continued)

FOREIGN PATENT DOCUMENTS

| EP | 0546739 | A2 | | 6/1993 |
|---|---|---|---|---|
| EP | 2893986 | | * | 7/2015 |
| GB | 473471 | A | | 10/1937 |

OTHER PUBLICATIONS

International Search Report issued in PCT/FR2015/051132, dated Jul. 29, 2015, 7 pages.

*Primary Examiner* — Prem C Singh
*Assistant Examiner* — Brandi M Doyle
(74) *Attorney, Agent, or Firm* — Albert Shung

(57) ABSTRACT

Embodiments of an injection device shaped in order to atomize a liquid into droplets by means of a gas are disclosed herein. The injection device may comprise a body having a gas inlet orifice intended to be connected to a gas supply duct. The injection device may further comprise an outlet orifice for discharging the atomized liquid. The injection device may also comprise a straight internal duct connecting the inlet orifice to the outlet orifice along an axial direction of said body. At least two liquid inlet ducts may be intended to be connected to at least one liquid supply duct pass through said body radially or substantially radially and open into said internal duct. These liquid inlet ducts may each have an axis and are arranged so that their axes intersect at one and the same point on an axial line extending inside the internal duct.

12 Claims, 2 Drawing Sheets

(58) Field of Classification Search
CPC ........... B05B 1/005; B05B 1/02; B05B 17/00; C10G 11/00
See application file for complete search history.

(56) References Cited

U.S. PATENT DOCUMENTS

| | | |
|---|---|---|
| 5,921,472 A | 7/1999 | Haruch |
| 2013/0145683 A1 | 6/2013 | Freel et al. |
| 2014/0091160 A1 | 4/2014 | Zhou et al. |

\* cited by examiner

Fig.4 atomization performance

Mean diameter of the droplets {relative value arbitrary unit}

- - - - Reference
——— Invention

Spray width {relative value arbitrary unit}

INJECTION DEVICE, IN PARTICULAR FOR INJECTING A HYDROCARBON FEEDSTOCK INTO A REFINING UNIT

CROSS-REFERENCE TO RELATED APPLICATIONS

This application claims the benefit of PCT/FR2015/051132, filed Apr. 27, 2015, which claims priority from FR 1454036 filed May 5, 2014.

The present invention relates to an injection device, in particular a hydrocarbon feedstock injection device of a refining unit, in particular a fluid catalytic cracking (FCC) unit.

The liquid hydrocarbon feedstocks treated in refining units are generally brought into contact with a solid catalyst which will promote the chemical reaction(s) to treating the feedstock. In order to improve this contact and to maximize the yield of the reactions, these liquid hydrocarbon feedstocks are atomized into fine droplets by injection devices. This atomization makes it possible to maximize the liquid (liquid hydrocarbon feedstock)-solid (catalyst) contact area, which promotes the heat transfer and contributes to the homogeneous distribution of the hydrocarbons within the reaction zone. Although there is no real consensus regarding the optimum diameter of the droplets, in general it is sought to form droplets whose diameter is of the same order of magnitude as the diameter of the catalyst particles, namely less than 200 microns, for example of the order of 50 to 80 microns.

Generally, use is made of "two-phase" injection devices, which have a hollow cylindrical body and two inlet openings through which the liquid hydrocarbon feedstock and an atomizing gas, generally steam, are respectively injected into said body. A contact chamber is arranged inside the body, in which the hydrocarbon feedstock and the atomizing gas are brought into contact in order to atomize the hydrocarbon feedstock. Once atomized, the hydrocarbon feedstock is ejected via an outlet opening that opens into the reactor. Each injection device is inserted on a reactor wall so that one end of the injection device comprising the outlet opening is located inside the reactor. Impaction injection devices are known in particular in which the feedstock is introduced radially and impacts a target located at the centre of the body, giving rise to the formation of droplets. An axially flowing atomizing gas makes it possible to entrain these droplets while dividing them further at the outlet of the body. Such injection devices are however complex and expensive to produce. Moreover, a problem of target erosion may be observed, especially when the feedstock to be injected contains particles, which entails reinforcing the target, further increasing the cost. Furthermore, problems of failure of the weld bonding the target with its support flange have been observed in service, making it necessary to manufacture the target and the flange from a single solid part, which drives up the production cost.

Increasingly heavy feedstocks are currently treated in refining units and very particularly in FCC units. The atomization of heavy feedstocks leads to a significant pressure drop at the injectors, which has the result of increasing the pressure of the feedstock supplying the injectors. It is then necessary to use powerful and expensive pumps to achieve the desired pressures at the injector outlet. Depending on the configurations of the two-phase injection devices, it may also prove necessary to considerably increase the flow rate of atomizing gas for atomizing heavy feedstocks. However, injecting larger amounts of atomizing gas increases the overall cost of the treatment and may also have a negative impact on the yield of the reactions by inducing undesired parallel reactions, especially when the atomizing gas is steam. This is the case when large amounts of steam are injected into FCC reactors. It is therefore preferable not to increase the atomizing gas flow rate. Moreover, the injection of large amounts of steam requires an oversizing of the effluent separation units downstream of the FCC unit, in particular for condensing the steam, which increases the production costs.

The reduced use of steam for atomizing the feedstock makes it possible to better control the distribution of the steam streams and to be able to supply a surplus thereof to sensitive zones of the FCC unit, for example to the valves where catalyst circulates or else to increase the amount of fluidizing gas at the bottom of the riser ("gas lift") to facilitate the circulation of the catalyst.

Finally, if it is possible to work at lower pressure, it is then possible to reduce the thicknesses of metal during the manufacture of the feedstock preheating lines, and therefore to reduce the production costs.

There is therefore a need for injection devices that cause only a small drop in the injection pressure, enabling the use thereof with heavy feedstocks without having to increase the atomizing gas flow rate, or the power of the pumps used.

The invention aims to at least partly overcome the aforementioned drawbacks. For this purpose, an injection device is proposed that is shaped in order to atomize a liquid into droplets by means of a gas, comprising a body having:
  a gas inlet orifice intended to be connected to a gas supply duct,
  an outlet orifice for discharging the atomized liquid,
  a straight internal duct connecting the inlet orifice to the outlet orifice along an axial direction of said body,
  characterized in that it comprises at least two liquid inlet ducts intended to be connected to at least one liquid supply duct, said liquid inlet ducts passing through said body radially or substantially radially and opening into said internal duct, these liquid inlet ducts each having an axis and being arranged so that their axes intersect at one and the same point on an axial line extending inside the internal duct.

The expression "axial line" is understood to mean a line that extends parallel to the axial direction of the body of the injection device.

An axis of an inlet duct within the meaning of the invention may be defined with reference to an equidistant curve, each point of which extends at equidistance from the side walls of an inlet duct, inside the latter. The axis of the inlet duct is then coincident with this equidistant curve when the inlet duct is straight, the equidistant curve then being a straight line. When the inlet duct has an axial symmetry, the axis of the inlet duct then corresponds to its axis of symmetry. When the inlet duct is curved, the equidistant curve is also curved. The axis of the inlet duct then corresponds to the tangent to this equidistant curve at the opening of the inlet duct into the internal duct, in other words where the inlet duct opens into the internal duct. Thus, generally, the axis of the inlet duct corresponds to the direction of the stream of liquid when it leaves the liquid inlet duct. The preferred inlet ducts are of cylindrical and/or truncated cone shape, and then have an axis of symmetry.

Due to the particular arrangement of the liquid inlet ducts of the injection device according to the invention, the liquid jets introduced through these inlet ducts impact against one another. Surprisingly, although these impacts do not take place against a solid target, they prove sufficient to obtain the formation of droplets, which are then swept up by the gas flowing along the axial direction in the internal duct, increasing the fractionation of the droplets. Moreover, a small pressure drop is observed between the inlet and the outlet of the injection device. It is thus possible to treat heavy feedstocks without having to use powerful and expensive pumps and without having to increase the gas flow rate.

Advantageously, the liquid inlet ducts may be located in the immediate vicinity of the gas inlet orifice in order to enable an immediate sweeping up of the droplets formed by the impact of the fluid jets exiting the liquid inlet ducts.

Advantageously, the liquid inlet ducts may be regularly distributed over the periphery of the internal duct.

Advantageously and non-limitingly, the axes of the inlet ducts may intersect on a central axial line of the body, in particular on an axis of symmetry of said body. This may make it possible to improve the efficiency of the injection device by positioning the point of impact of the fluid jets opposite the inlet orifice, generally centered on the axis of symmetry of the body.

The liquid inlet ducts pass through the body of the injection device radially or substantially radially. The term "radial" is understood to mean a direction that extends perpendicular to the axial direction in which the body extends. When the axis of an inlet duct is substantially radial, it is considered that it may be slightly inclined with respect to a radial direction, for example by at most 20°, or even by at most 10°, preferably by at most 5°.

However, in order to improve the efficiency of the injection device and to facilitate the production thereof, the axis of each liquid inlet duct may advantageously extend perpendicular to the axial direction of said body. Advantageously, the axes of all the inlet ducts may thus extend in one and the same radial plane. The axes of two inlet ducts may then be coincident when these ducts are facing each other. Depending on the available surroundings, it is possible however to envisage inlet ducts of which some (at least two) have their axis in a same radial plane and others (at least two) have their axis in another separate radial plane.

The number of liquid inlet ducts may be variable. Two inlet ducts, which are then preferably located opposite one another, their axes extending in a same radial plane, are sufficient however to obtain the atomization of the liquid into droplets. The production of only two inlet ducts may additionally facilitate the production of an injector according to the invention.

It is possible however to envisage a larger number of inlet ducts depending on the dimensions of the injector.

The number of liquid inlet ducts may be an even number. In this case, the inlet ducts are paired up, the axes of two ducts of a same pair extending in a same plane containing the axial line. Two paired inlet ducts preferably being positioned opposite one another.

It may then be advantageous for the paired liquid inlet ducts to have a cross section of the same area. This may make it possible to avoid having to control the liquid flow rates and/or velocity of each inlet duct in order to position the point of impact of the liquid jets substantially at the centre of the body, an a priori optimal position for the droplets to be entrained by the gas entering the body through the inlet orifice. However, two paired inlet ducts may have a cross section of the same area, but different from the area of a cross section of two other paired inlet ducts.

It may however be simpler for all the inlet ducts to have a cross section of the same area, in particular identical cross sections.

The number of liquid inlet ducts may also be an odd number, for example at least three. In this case, the inlet ducts are preferably distributed regularly over the periphery of the body.

It may be preferable for all the liquid inlet ducts to have a cross section of the same area, in particular identical cross sections, in order to avoid a control of the liquid flow rates and/or velocity in order to position the point of impact of the liquid jets at the centre of the body.

Advantageously and non-limitingly, the liquid inlet ducts may project into the internal duct. This may make it possible to avoid formation of a flow of liquid along the inner walls of the body of the injection device. Moreover, a better atomization of the liquid is observed. In particular, with respect to an embodiment in which the liquid inlet ducts do not project into the internal duct, for identical liquid and gas flow rates, an injection device in which the liquid inlet ducts project into the internal duct permits a better atomization, without significant variation of the pressure drop between the inlet and the outlet of the injection device. By way of example, the liquid inlet ducts may project by a predetermined distance, in particular by several millimetres to several centimetres, for example from 4 to 20 mm. The extension of the liquid ducts on the inside makes it possible to guide the liquid stream from each of the liquid inlet ducts so that said streams collide as effectively as possible.

Each liquid inlet duct may be connected directly to a liquid supply duct. In this case, it may be preferable to limit the number of liquid inlet ducts, for example to two, in particular when the available space around the injection device is limited.

In order to enable a positioning of the injection device in restricted surroundings, it may then be advantageous to provide a chamber external to the body and coaxial therewith, arranged so that said liquid inlet ducts are in fluid communication with said external chamber. It is then possible to connect this external chamber to one or more liquid supply ducts depending on the space available. Thus, when space is very limited, the external chamber may be connected to a single liquid supply duct. This may additionally make it possible to avoid a modification of the unit in which the injection device according to the invention must be installed, such units in general comprising a single liquid supply duct for each injection device.

This external chamber may advantageously be shaped so that the liquid is distributed equitably between the various liquid inlet ducts.

Said at least one supply duct may be positioned perpendicular or substantially perpendicular to the axial line.

It is also possible to make provision for positioning said at least one liquid supply duct tangentially to said external chamber, in other words tangentially to its wall. This may make it possible to maintain a substantially constant velocity of the liquid throughout the internal volume of the external chamber.

The external chamber may have a shape with rotational symmetry, for example a cylindrical shape, the body of the injection device also having a cylindrical cross section.

The invention also relates to a reactor for treating a hydrocarbon feedstock, in particular a catalytic cracking reactor, comprising at least one injection device according to the invention positioned so that its outlet orifice opens into said reactor.

The invention also relates to a process for the catalytic cracking of a hydrocarbon feedstock in at least one reactor, in which the hydrocarbon feedstock is injected, preferably continuously, into said at least one reactor, said hydrocarbon feedstock being injected through the liquid inlet ducts of at least one injection device according to the invention, a gas simultaneously supplying each injection device through the gas inlet orifice.

The hydrocarbon feedstock is customarily injected at least partly in the liquid state, at a temperature ranging from ambient temperature to 500° C., for example from 80° C. to 300° C., but more generally from 200° C. to 300° C. The hydrocarbon feedstock may be injected at a pressure of the order of 4 to 8 bar upstream of the injector. Generally, the pressure difference of the feedstock between the inlet and the outlet of the injector according to the invention is between 1 and 10 bar, preferably between 2 and 5 bar, whereas in the case of impact injectors according to the prior art, it is necessary to double the pressure difference between the inlet and the outlet in order to obtain the same nebulization quality.

The gas used may be steam, or any other suitable gas, such as for example a gaseous effluent resulting from the conversion of hydrocarbons, light olefins or a mixture of these gases.

Advantageously, in each injection device, the proportion of gas with respect to the hydrocarbon feedstock may be from 1.5% to 5% by weight, for example from 2% to 4% by weight.

The flow rates of hydrocarbon feedstock and of gas supplying each injection device may advantageously be controlled so as to obtain a hydrocarbon feedstock flow rate at the outlet of each injection device that ranges from 15 to 80 t/h, preferably from 40 to 60 t/h. This control may be obtained conventionally by means of pumps, flowmeters or other means.

The velocity of the hydrocarbon feedstock at the outlet of a liquid inlet duct of an injection device may be from 10 to 40 m/s, for example ideally 15 m/s.

The pressure drop of the gas entering through the inlet orifice of an injection device may be 60% to 110% of the pressure drop corresponding to a critical flow regime, and may be from 80% to 100%, for example 90%.

The invention is now described with reference to the non-limiting appended drawings, in which:

FIGS. 3a and 3b are photographs of the sprays obtained respectively with a conventional impact injection device and with an injection device according to the embodiment from FIG. 1;

FIG. 4 is a graph representing the distribution of the mean droplet size as a function of the spray angle at a relative distance from the outlet orifice, for a conventional impact injection device (reference) and for an injection device according to the embodiment from FIG. 1 (invention) as a function of the distance to the discharge axis (X axis from FIG. 1).

The expression "substantially parallel or perpendicular" is understood to mean a direction that deviates by at most ±20°, or even by at most 10° or by at most 5° from a parallel or perpendicular direction.

Figure 1:
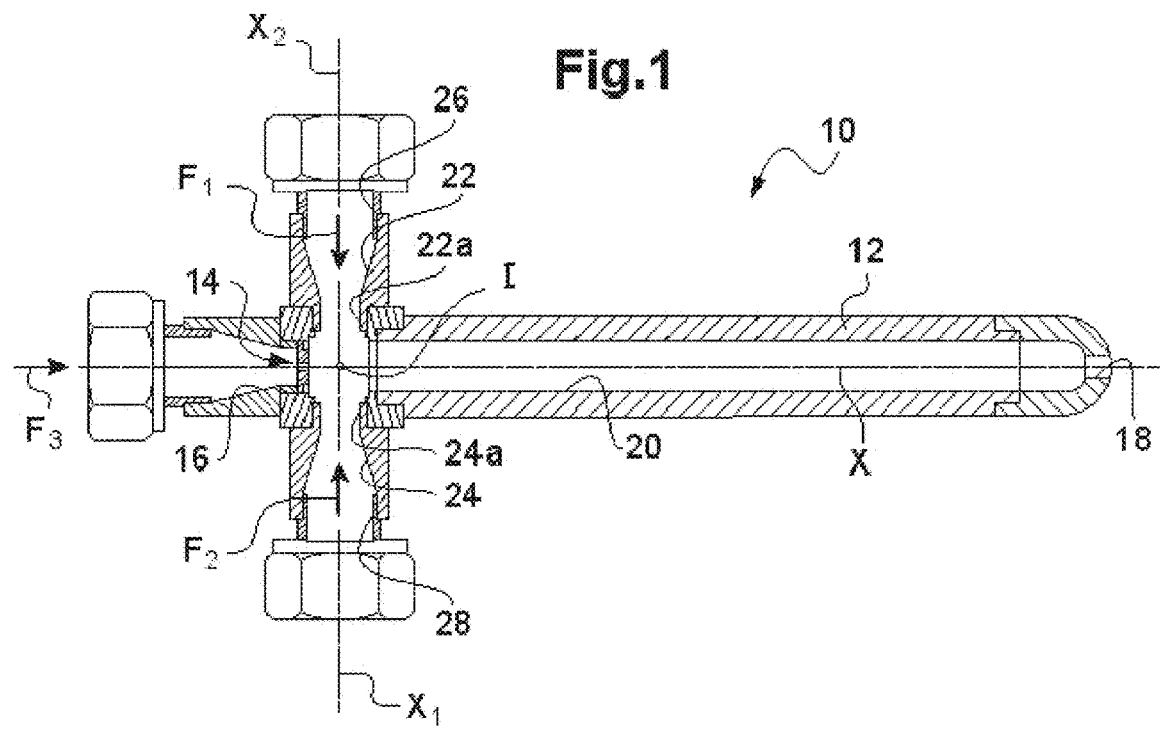
FIG. 1 represents an axial cross-sectional view of an injection device according to one embodiment of the invention.

FIG. 1 represents an injection device 10 shaped in order to atomize a liquid into droplets by means of a gas. This injection device 10 comprises a body 12 having:

a gas inlet orifice 14 connected to a gas supply duct 16,
an outlet orifice 18 for discharging the atomized liquid,
a straight internal duct 20 connecting the inlet orifice 14 to the outlet orifice 18 along an axial direction X of the body 12.

The internal duct 20 forms a mixing zone for the gas and atomized liquid. It usually has a cylindrical shape, as does the body 12, like in the present example.

Usually, the injection device 10 may be produced as one or more parts, made of steel, in particular stainless steel, or other material.

According to the invention, this injection device 10 comprises at least two liquid inlet ducts intended to be connected to at least one liquid supply duct. These liquid inlet ducts pass through the body 12 radially or substantially radially, and open into the internal duct 20. They each have an axis and are arranged so that these axes intersect at one and the same point on an axial line extending inside the internal duct.

In the example represented in FIG. 1, the injection device 10 comprises two liquid inlet ducts 22 and 24 each connected to a liquid supply duct 26, 28 respectively. The two ducts 22, 24 each have an axis $X_1$, $X_2$, which here are coincident. The axial line is coincident with the axial direction X, which here forms an axis of symmetry of the body 12 and of the internal duct 20. The axes $X_1$, $X_2$ thus intersect the axial line X at a point I.

The internal dimensions of the injection device represented in FIG. 1 are similar to the dimensions customarily used for impact injection devices for impact with a target, the surface of which extends in a plane containing the axial line X. By way of example, the internal diameter of the openings 22a, 24a, and of the inlet orifice 14, usually of circular shape as in the example represented, are of the order of one inch, i.e. around 2.5 cm. The internal diameter of the internal duct 20 may be of the order of three to six inches, in other words of the order of 7 to 16 cm, or even optionally reaching eight inches, i.e. around 20 cm. As seen in FIG. 1, the gas supply duct 16 has a convergent shape, here a conical shape, along the gas flow direction, making it possible to accelerate the gases at the inlet thereof into the internal duct 20 of the body 12. Similarly, the inlet ducts 22, 24 open into the internal duct 20 via openings 22a, 24a, respectively, which have a cross section of reduced area relative to the area of the cross sections of these ducts, also for inducing an acceleration of the hydrocarbon feedstock when it enters into the internal duct 20. Here, the inlet ducts 22, 24 have a conical shape, their openings 22a, 24a being circular.

It should also be noted that the inlet ducts 22, 24 are positioned in the immediate vicinity of the inlet orifice 14 of the body 12. This corresponds to the customary position of the inlet duct in an impact injection device 20, for impact with a solid target, and enables good entrainment of the droplets formed by the gas.

The end of the injection device 10 through which the atomized liquid spray exits is generally rounded, for example spherical. The outlet orifice 18 of this end may have a shape similar to the shapes of conventional impact injection devices and may be chosen as a function of the desired spray shape. It may be a cylindrical or truncated cone orifice, a slit, etc.

The injection device 10 represented in FIG. 1 operates in the following manner: the hydrocarbon feedstock is injected via the ducts 22 and 24 into the internal duct 20 of the body 12 along the directions of the arrows F1, F2 respectively. An atomizing gas is itself introduced into the internal duct 20 through the duct 16, then the inlet orifice 14, along the direction of the arrow F3. The two hydrocarbon feedstock jets from ducts 22 and 24 come into contact with one another at the centre of the internal duct substantially on the axial line X thus inducing the formation of droplets. These droplets are entrained by the gas flowing in the direction F3 up to the outlet orifice 18 of the injection device 10. In the zone of the internal duct 20 located downstream of the point of impact I of the jets, the droplets of the hydrocarbon feedstock end up mixing with the gas homogeneously before the exit thereof through the outlet orifice 18.

In the example represented in FIG. 1, the inlet ducts 22, 24 are thus connected to two separate hydrocarbon feedstock supply ducts. When the surroundings of the injection device are restricted, this arrangement may prove to take up too much space. It may then be advantageous to produce an injection device as represented in FIG. 2.

Figure 2:
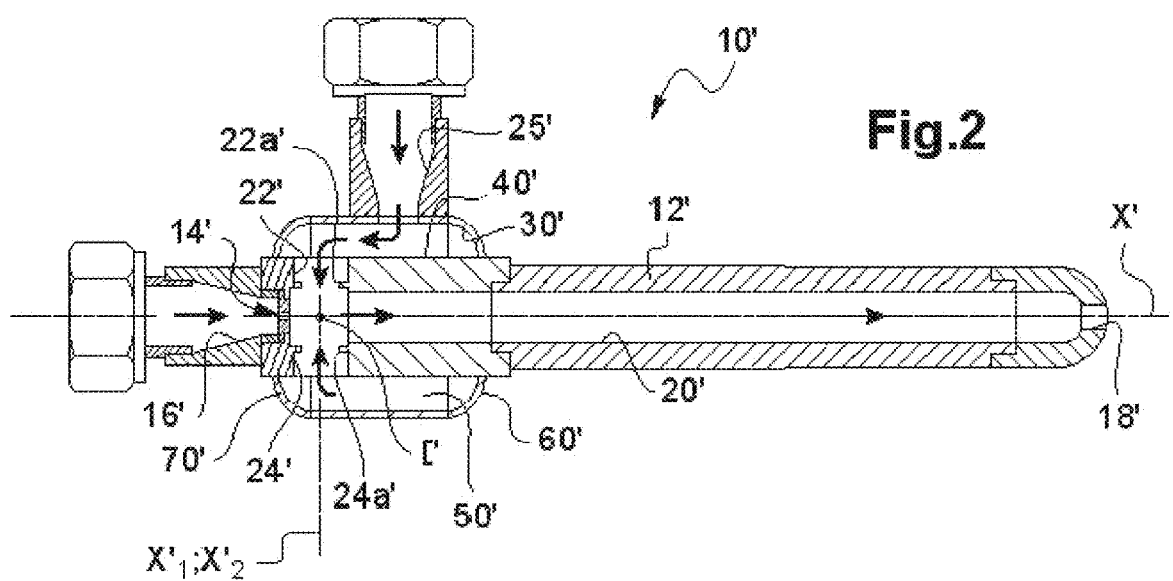
FIG. 2 represents an axial cross-sectional view of an injection device according to another embodiment of the invention.

The embodiment represented in FIG. 2 differs from that represented in FIG. 1 essentially by the hydrocarbon feedstock supply of the inlet ducts. The same elements are denoted by the same references with the addition of a prime symbol"'".

In FIG. 2, an injection device 10' also comprises a body 12' comprising an inlet opening 14', an outlet opening 18', and two inlet ducts 22'; 24', respectively. In a manner similar to the preceding embodiment, a gas supply duct 16' is connected to the inlet opening 14'. On the other hand, the liquid inlet ducts 22' and 24' are no longer each connected to a supply duct but are in fluid communication with an external chamber 30', which coaxially surrounds the body 12' of the injection device 10'. Here, the external chamber 30' has a cross section of annular shape, the body 12' having a cylindrical shape. The inlet ducts 22', 24' are arranged symmetrically opposite, their axes $X'_1$, $X'_2$ being coincident and intersecting the axial line X' at a point I'.

The external chamber 30' is itself in fluid communication with a single supply duct 25'. This external chamber 30' may be shaped so that the liquid is distributed equitably between the two inlet orifices 22' and 24'. For example, and according to a first embodiment, an equitable distribution between the two inlet orifices 22' and 24' may be obtained when they are positioned equidistant from the liquid supply duct 25'. A method according to a second embodiment consists in laterally moving the duct 25' so that it opens into the external chamber 30' at one of the ends 60' or 70', said external chamber 30' taking the shape of a plenum chamber 50' arranged so that the stream resulting from the liquid supply duct 25' is forced to pass along a wall 40' before passing through the inlet ducts 22', 24' positioned at the other of the ends 70' or 60'.

This liquid supply duct 25' has a shape similar to the inlet ducts 22, 24 from the preceding example, namely a conical shape, the cross section of which decreases in the fluid flow direction. For their part, the inlet ducts 22', 24' open at an opening 22'a, 24'a respectively into the internal duct 20'. These openings 22'a, 24'a here have a cross section smaller than the cross section of the ducts 22', 24' respectively. However, these cross sections could be of the same dimensions as the ducts 22', 24'. Here, the ducts 22' and 24' are of cylindrical shape, the openings 22'a, 24'a being circular.

In the various embodiments represented with reference to FIGS. 1 and 2, the cross sections of the openings 22a, 24a or 22'a, 24'a are of the same area, and here are identical.

The operation of the injection device represented in FIG. 2 is similar to that of the injection device from FIG. 1, the arrows represented showing the flow directions of the various fluids.

The invention is not limited to the embodiments described, nor to the particular forms described in these embodiments. More than two inlet ducts may in particular be envisaged, for example three that are regularly distributed, or more, for example 4 or more depending on the dimensions of the injection device and the desired dimensions of the cross sections of the inlet ducts.

EXAMPLE

An injection device similar to that described with reference to FIG. 1 was tested for the atomization of water, the gas being air. The device tested was produced with dimensions such that the diameter of the internal duct is 10 times smaller than the diameter of a device customarily used for an application in a catalytic cracking reactor.

The injection device tested has the following dimensions:
diameter of the opening that opens into the internal duct for the injection of the liquid: 1.56 mm,
diameter of the opening that opens into the internal duct for the injection of the gas: 1.58 mm,
diameter of the internal duct: 8 mm,
length of the internal duct: 132.5 mm
outlet orifice: slit of thickness 2.52 mm and of angular amplitude of opening of 105° (slit made on a spherical end having an external radius of 5.6 mm).

A conventional impact injection device having the same dimensions was also tested. This conventional impact injection device has a single liquid inlet duct and a solid target, the impact surface of which containing the axial line X is located opposite the liquid inlet duct. Such a conventional impact injection device is similar to that represented in patent U.S. Pat. No. 4,434,049, with however an outlet orifice of different shape.

The test conditions are the following:
Water flow rate: 226.2 kg/h,
Air flow rate: 6.1 kg/h,
Velocity of the gas at the inlet orifice: 300 m/s,
Velocity of the water at the opening 22a, 24a: 15 m/s,
Gas/liquid ratio: 2.7% by weight.
Spray shape obtained FIGS. 3a, 3b represent images of the atomized liquid sprays leaving each of the injection devices. These images are recorded on a black background by direct illumination using a stroboscope. It is observed that the sprays obtained have similar shapes, the spray obtained with the device according to the invention however appears denser.

Measurement of the Pressure Drop

The injection devices tested diffused into the ambient air. Consequently, the relative pressure of liquid at the inlet is equal to the pressure drop. The measurement was carried out by means of a manometer measuring the inlet pressure. The relative pressure of liquid at the inlet is measured at 10 barg for the conventional impact injection device. This value is slightly higher than the value estimated by calculation (8.2 barg). The relative pressure of liquid at the inlet was measured at 2.6 barg for the injection device according to the invention, i.e. a reduction by a factor of 3 to 4.

Measurement of the size of the droplets and the distribution thereof

The mean size of the droplets and also their distribution at the outlet of the injection devices was measured by means of a particle size analyser using the laser diffractometry technique enabling the measurement of:
the diameter of a set of spherical or non-spherical particles,
the spatial concentration of particles.

The apparatus used is a particle size analyser sold by the company Malvern using a helium-neon gas laser having a power of 4 mW generating a beam of red light having a diameter of 10 mm and a wavelength of 632 nm. The light scattered forward by the particles is collected via a Fourier lens through a receiving part, colinear to the laser, comprising a detector formed of silicon photodiodes positioned in concentric rings. This receiving part records the diffraction pattern resulting from the laser beam crossing the jet of particles. The measurement range of the particle size analyser used covers sizes from 0.1 µm to 1000 µm.

FIG. 4 is a relative comparison of the performances of an impact injector according to the prior art and of an injector according to the invention. The y-axis represents the mean diameter values of the droplets (relative value, arbitrary unit) measured at a distance of 300 mm from the outlet orifice parallel to the discharge axis (corresponding to the axial line X from FIG. 1), the x-axis represents a relative value of spray width (or spray angle) (relative value, arbitrary unit) corresponding to the ratio of the measurement distance with respect to the discharge axis in a direction perpendicular to this discharge axis over the total width of the spray. In other words, the value 0.0 of the x-axis corresponds to a measurement carried out on the discharge axis whereas the value 1.0 corresponds to a measurement made level with a maximum spray width.

It is observed that the sprays obtained with the injection device according to the invention and the conventional impact injection device are similar and homogeneous. The mean size of the droplets is less than 150 µm.

In conclusion, the injection device according to the invention makes it possible to obtain a spray of droplets similar to the impact injection devices but with a considerably reduced pressure drop, enabling the treatment of heavy feedstocks without having to use powerful pumps or an excessively large amount of steam.

The invention claimed is:

1. An injection device shaped in order to atomize a liquid into droplets by means of a gas, comprising a body having:
   a gas inlet orifice intended to be connected to a gas supply duct,
   an outlet orifice for discharging the atomized liquid,
   a straight internal duct connecting the inlet orifice to the outlet orifice along an axial direction of said body,
      characterized in that said injection device comprises at least two conical liquid inlet ducts intended to be connected to at least one liquid supply duct, said liquid inlet ducts passing through said body radially or substantially radially and opening into said internal duct, said liquid inlet ducts each having an axis and being arranged so that their axes intersect at one and the same point on an axial line extending inside the internal duct, and
      wherein the injection device comprises a chamber external to the body and coaxial therewith, arranged so that said liquid inlet ducts are in fluid communication with said external chamber, wherein at least one of said liquid inlet ducts is positioned perpendicular to an axial line of the external chamber, said external chamber being in fluid communication with at least one liquid supply duct and at least two or more inlet ducts which are in fluid communication with the internal duct, and wherein the external chamber is configured such that the liquid flows through the external chamber counter currently to the flow of gas.

2. An injection device according to claim 1, characterized in that said axial line forms an axis of symmetry of said body.

3. An injection device according to claim 1, characterized in that the axis of each liquid inlet duct extends perpendicular to the axial direction of said body, wherein each liquid inlet duct is in a same radial plane.

4. An injection device according to claim 1, characterized in that it comprises an even number of liquid inlet ducts, the inlet ducts being paired up, the axes of two ducts of a same pair extending in a same plane containing the axial line.

5. An injection device according to claim 1, characterized in that it comprises an odd number of liquid inlet ducts.

6. An injection device according to claim 1, characterized in that all the inlet ducts have a cross section of the same area.

7. An injection device according to claim 1, characterized in that the liquid inlet ducts project into the internal duct.

8. An injection device according to claim 1, characterized in that said at least one liquid supply duct extends perpendicular relative to the axial line extending inside the internal duct.

9. A catalytic cracking reactor for treating a hydrocarbon feedstock, comprising at least one injection device according to claim 1 positioned so that its outlet orifice opens into said reactor.

10. A process for the catalytic cracking of a hydrocarbon feedstock in at least one reactor, in which said hydrocarbon feedstock is injected, into said at least one reactor, said hydrocarbon feedstock being injected through the liquid inlet ducts of at least one injection device according to claim 1, a gas simultaneously supplying each injection device through the gas inlet orifice.

11. A catalytic cracking process according to claim 10, in each injection device, in which the proportion of gas with respect to the hydrocarbon feedstock is from 1.5% to 5% by weight.

12. A catalytic cracking process according to claim 11, in which the flow rates of hydrocarbon feedstock and of gas supplying each injection device are controlled so as to obtain a hydrocarbon feedstock flow rate at the outlet of each injection device that ranges from 15 to 80 t/h.

* * * * *